US006193319B1

(12) United States Patent
Kielinski

(10) Patent No.: US 6,193,319 B1
(45) Date of Patent: Feb. 27, 2001

(54) HANDLE-PROPELLED, LOAD-CARRYING LAND VEHICLE

(76) Inventor: Thomas P. Kielinski, 215 Stenton Ave., Plymouth Meeting, PA (US) 19462

( * ) Notice: Subject to any disclaimer, the term of this patent is extended or adjusted under 35 U.S.C. 154(b) by 0 days.

(21) Appl. No.: 09/540,449

(22) Filed: Mar. 31, 2000

Related U.S. Application Data
(60) Provisional application No. 60/127,407, filed on Apr. 1, 1999.

(51) Int. Cl.[7] ............................................. B62B 1/00
(52) U.S. Cl. ............................ 298/2; 298/5; 298/10; 298/178; 298/17 SG; 298/38; 280/47.12; 280/47.31; 280/47.18; 280/47.26
(58) Field of Search .......................... 298/2, 1 C, 7, 298/10, 38, 17 B, 17 SG, 5; 280/47.12, 47.31, 47.17, 47.26, 47.18, 63, 653

(56) References Cited

U.S. PATENT DOCUMENTS

| 405,777 | * | 6/1889 | Hill | 298/5 |
|---|---|---|---|---|
| 677,467 | * | 7/1901 | Potter | 298/2 |
| 2,770,491 | | 11/1956 | Perko | 298/10 |
| 2,852,304 | | 9/1958 | Harrison | 298/3 |
| 2,895,238 | | 7/1959 | Long | 37/130 |
| 3,160,439 | | 12/1964 | Kazakowitz | 298/2 |
| 3,578,806 | * | 5/1971 | Tonelli | 298/2 |
| 3,888,501 | | 6/1975 | McChesney | 280/47.18 |
| 4,270,786 | * | 6/1981 | Mattox | 298/10 X |
| 4,588,197 | | 5/1986 | Benedetto, Jr. | 280/47.18 |
| 4,629,203 | | 12/1986 | Ballard | 280/47.26 |
| 4,632,461 | * | 12/1986 | Randolph | 298/2 |
| 4,789,171 | | 12/1988 | Porter | 280/47.18 |
| 4,861,110 | | 8/1989 | Rumpke | 298/2 |
| 5,149,116 | | 9/1992 | Donze | 280/47.26 |
| 5,884,924 | * | 3/1999 | Fairchild et al. | 280/47.31 |

* cited by examiner

Primary Examiner—Stephen T. Gordon
(74) Attorney, Agent, or Firm—Howson & Howson

(57) ABSTRACT

A handle-propelled, load-carrying land vehicle comprises a frame having two parts, one having wheels and ground-engaging pedestals forward of the wheels, and the other being pivoted to the front of the first part and having a load-carrying receptacle mounted on it and having a telescoping handle. The device is balanced so that it can be easily propelled by pushing downward and forward on the handle. It is especially useful as a dumping hand cart for granular loads, since the forward edge of the receptacle is spaced from the ground at least at the completion of the dumping operation. A gravity-operated latch keeps the frame parts together to allow the load carrier to be pulled up steps, up a slope, or up over a curb without having the wheels separate from the receptacle, but automatically releases, allowing the user to dump a load of material from the receptacle by pushing forward on the handle.

10 Claims, 7 Drawing Sheets

HANDLE-PROPELLED, LOAD-CARRYING LAND VEHICLE

CROSS-REFERENCE TO RELATED APPLICATION

This application claims the benefit of the priority of my provisional application Ser. No. 60/127,407, filed Apr. 1, 1999.

SUMMARY OF THE INVENTION

This invention relates to land vehicles, and more particularly to an improved, tiltable, handle-propelled vehicle having laterally spaced wheels and a receptacle body.

Many different kinds of handle-propelled load carriers, known generally by terms such as "hand carts" or "barrows," have been proposed for use in carrying and dumping heavy loads such as soil, gravel, stones, fertilizers and other materials. One popular design is the conventional wheelbarrow, which comprises a load-carrying receptacle having a single, forwardly located wheel, a pair of feet located underneath a rear part of the receptacle, and a pair of handles extending to the rear. The conventional wheelbarrow has the advantage that its contents can be dumped by tilting the wheelbarrow forward or to either side. However, to propel the wheelbarrow, the operator needs to lift the handles to raise the wheelbarrow's feet off the ground, and hold the handles in the raised condition while walking forward. With very heavy loads, the wheelbarrow places a considerable strain on the operator, and unless great care is exercised, the operator can sustain serious and debilitating lower back injury while propelling the wheelbarrow.

Modified wheelbarrows having two laterally spaced wheels have been proposed, but are subject to the same problems that are inherent in the conventional wheelbarrow. Moreover, the modified wheelbarrows have the drawback that their contents cannot be easily discharged to the side.

To facilitate dumping of heavy loads, hand carts have been designed with receptacles that tilt relative to a frame, frame, and with various mechanisms for facilitating the tilting motion.

Hand carts with laterally spaced wheels have also been designed with the axle of the wheels located behind the center of gravity of the load so that, instead of lifting upward on the handle or handles to propel the cart, the operator pushes downward, thereby avoiding the back strain encountered in operating a conventional wheelbarrow.

Examples of some of the foregoing hand carts are depicted in the following U.S. patents.

| | |
|---|---|
| 2,770,491 | Perko |
| 2,852,304 | Harrison |
| 2,895,238 | Long |
| 3,160,439 | Kazakowitz |
| 3,888,501 | McChesney |
| 4,588,197 | Benedetto, Jr. |
| 4,629,203 | Ballard |
| 4,789,171 | Porter |
| 4,861,110 | Rumpke |
| 5,149,116 | Donze et al. |

The prior hand carts have all had limitations on the ease with which a load can be transported and dumped. Even in the case of U.S. Pat. No. 2,895,238, some limitations are encountered. The patent describes a dump scoop having a load-receiving body pivoted on a frame having a handle and rearwardly located wheels. Dumping is carried out by tilting the body on its pivot axis until a front edge of the body engages the ground, and then continuing to tilt the body forward, using a separate handle. The load-receiving body has an open front, and is therefore limited in its ability to carry a large load of granular material. Because of its open front, the body can discharge a part of a granular load. However, because the forward edge of the body contacts the ground throughout the dumping operation, the complete discharge of the granular load can require special manipulations.

The principal object of this invention is to provide a dumping hand cart that has one or more of the following advantages: simplicity, low cost, and light-weight construction, ergonomic design, safety, ability to handle and dump heavy granular loads without difficulty, and avoidance of one or more of the various limitations of prior art hand carts.

The handle-propelled, load-carrying land vehicle in accordance with the invention comprises: a first frame having a front, a rear and left and right sides; an axle connected to the first frame adjacent the rear thereof and extending laterally therefrom; wheels on the axle, the wheels being rotatable and positioned laterally outboard of the first frame; a ground-engaging pedestal connected to the first frame and extending downward therefrom at a location forward of the axle; and a second frame pivotally connected to the first frame by a hinge having a hinge axis substantially parallel to, and forward of, the axle, preferably adjacent the front of the first frame. The second frame is pivotable forwardly and rearwardly about the hinge axis from a hauling position, in which it extends rearwardly from the hinge axis toward the axle, to a dumping position in which it extends upward from the first frame; a stop on the first frame, engageable with the second frame, for limiting rearward pivoting movement of the second frame; a handle rigidly connected to the second frame and extending upwardly and rearwardly therefrom, the handle being movable downwardly to rotate both frames about the axle so that the ground-engaging pedestal is lifted away from the ground and the frames can be moved on the wheels by manually operation of the handle, and also being movable upwardly to pivot the second frame forward about the hinge axis; a load-receiving receptacle secured to the second frame and tiltable forward with the second frame when the second frame is pivoted forward about the hinge axis. In a preferred embodiment of the invention, suitable for carrying heavy granular loads, such as soil, fertilizer, gravel, small rocks or the like, the receptacle has a bottom, and front, rear and side walls. The upper edge of the front wall of the receptacle is preferably positioned in relation to the hinge axis so that, with the wheels in contact with the ground, the front wall of the receptacle can assume a forward and downward slope sufficient to discharge the granular load while the upper edge of the front wall is spaced from the ground. The pedestal is preferably positioned so that it contacts the ground at a location forward of the axle of the wheels but rearward of the hinge axis. The first frame can be tilted forward on the pedestal about the contact location in order to bring the top edge of the front wall of the receptacle into close proximity to, or into contact with, the ground.

An alternative embodiment of the dumping hand cart has a releasable latch connecting the first and second frames. The latch holds the first frame in fixed relation to the second frame when the handle is pulled upward in a direction to lift the wheels off the ground. This prevents the wheels from separating from the receptacle, allowing the user to pull the cart up steps, up a slope, or up over a curb. In a preferred embodiment, the latch automatically releases the second frame for pivoting to the dumping position when the handle is pushed forward while the wheels are on the ground.

The latch preferably takes the form of a hook pivotally suspended from the second frame, and a hook-retaining surface on the first frame. The hook comprises a leg extending downward from the second frame and a retaining surface-engaging element projecting rearwardly from the leg and located so that it is below and spaced from the hook-retaining surface when the second frame is in its hauling position and no upward pulling force is exerted on the handle. The spacing is sufficiently small that the retaining surface-engaging element engages the hook-retaining surface to hold the second frame substantially in the hauling position when said handle is pulled upward in a direction to lift the wheels off the ground, but allows the hook to clear the hook-retaining surface automatically when the handle is pushed forward while the wheels are on the ground.

A selectably engageable lock may be included for preventing automatic release of the second frame. The lock is preferably selectably positionable forward of the leg of the hook and engageable thereby, to limit forward movement of the hook and thereby maintain the retaining surface-engaging element of the hook in a position to engage the retaining surface.

The dumping hand cart in accordance with the invention not only provides for easy transportation and dumping of granular loads, but is also adaptable to easy modification by changing the load-receiving receptacle to one of a different size or shape, and by replacing the wheels and/or pedestals with wheels and/or pedestals of a different size. The height of the receptacle from the ground is maintained near a minimum for improved stability, balance, safety and control. The latch keeps the wheels from separating from the receptacle when the hand cart is pulled backwards up a slope or steps or up over a curb, but, in a preferred embodiment, releases automatically when the user tilts the handle forward, allowing the user to dump a load of material without reaching down to disengage the latch.

Other objects, details and advantages of the invention will be apparent from the following detailed description when read in conjunction with the drawings.

DETAILED DESCRIPTION

Figure 1:
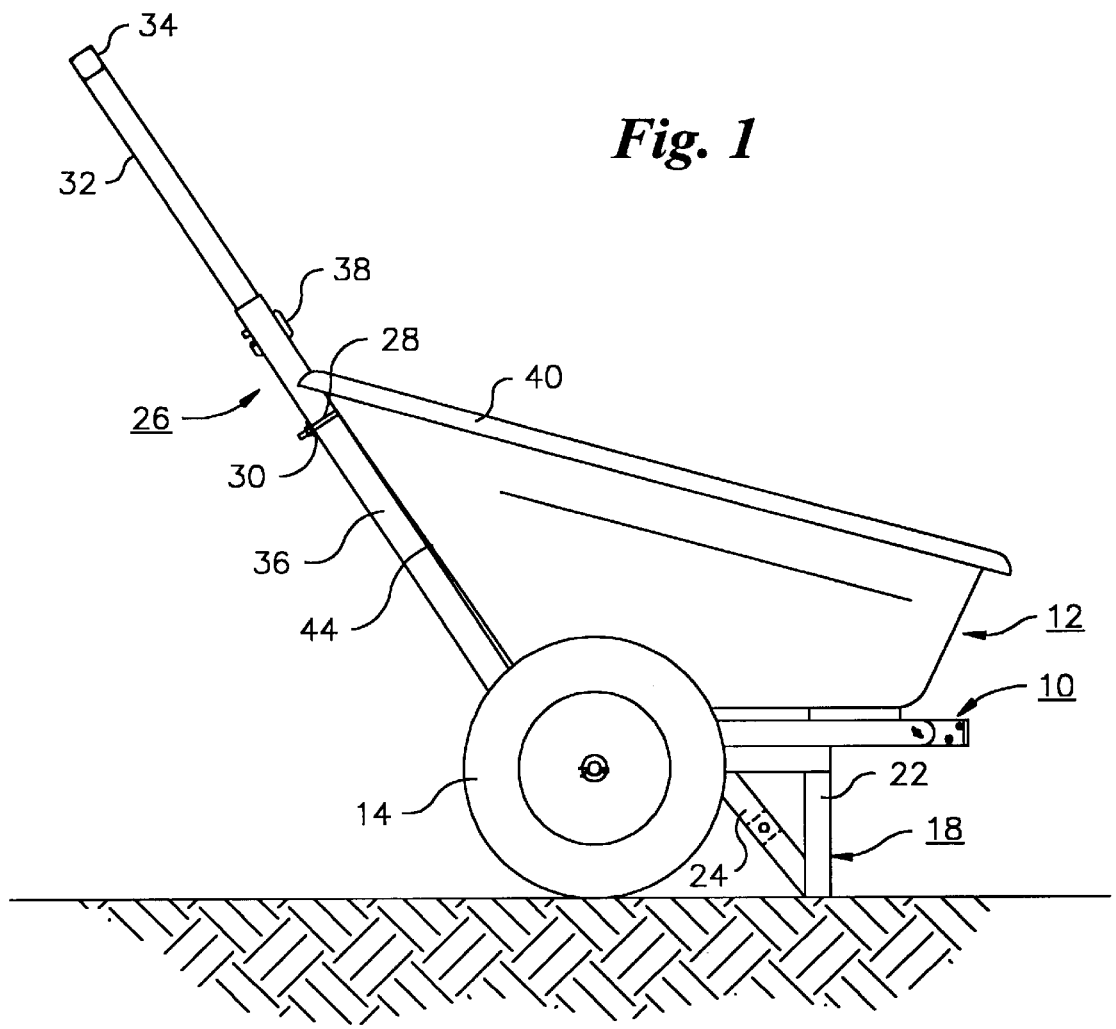
FIG. 1 is a side elevation of a load-carrying land vehicle in accordance with the invention.
Figure 2:
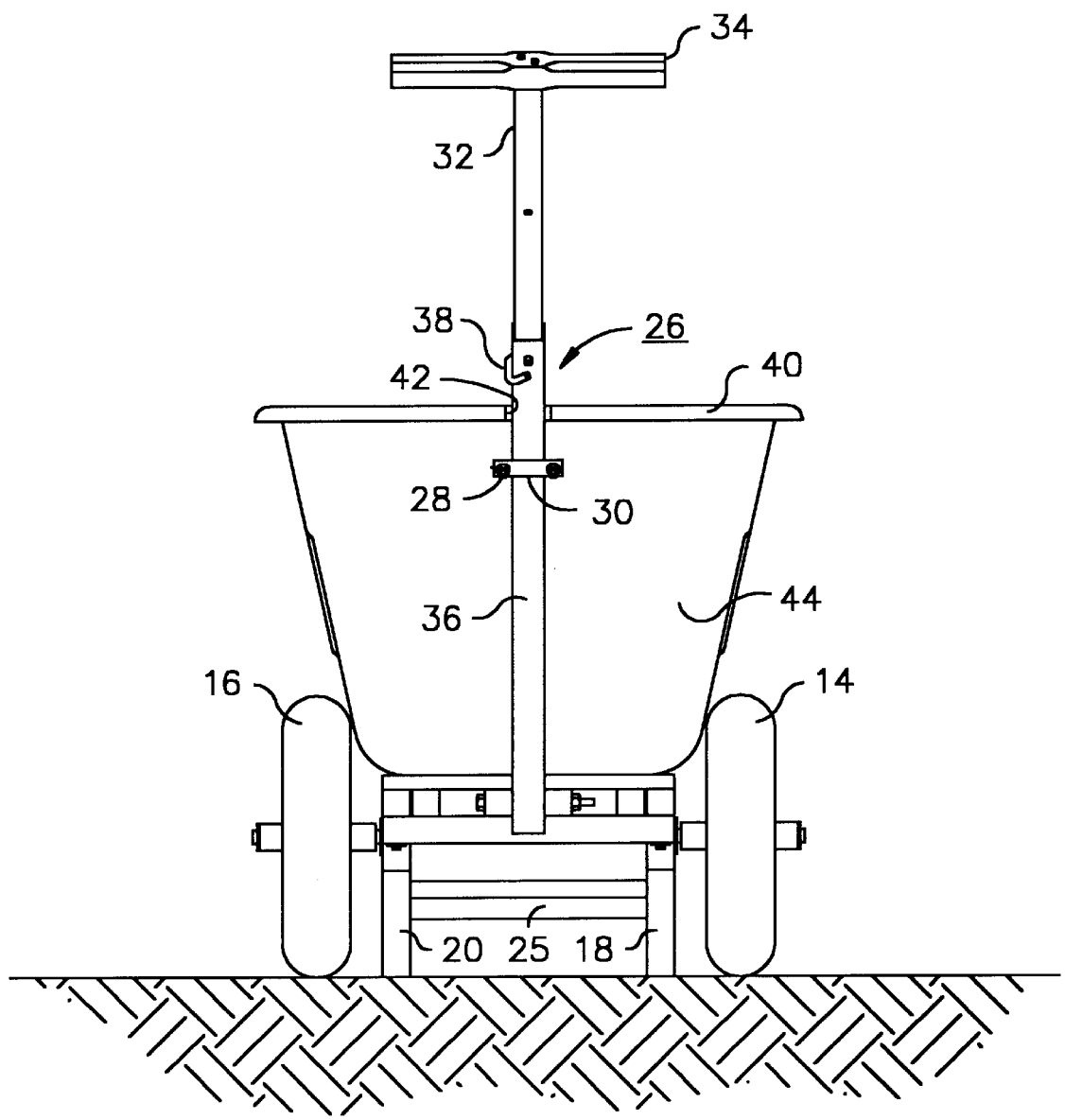
FIG. 2 is a rear elevational view thereof.

As illustrated in FIG. 1, the load-carrying land vehicle of the invention comprises a frame 10, on which is mounted a load-carrying receptacle 12, which is preferably made of molded polyethylene or similar material, although it can be made of metal, reinforced polyester or any of a wide variety of suitable materials. The frame has a pair of laterally spaced wheels 14 and 16 (FIG. 2) on an axle which is located a short distance to the rear of a point directly underneath the normal location of the center of gravity of the load carrier and its load. Especially in the case of a granular load, the center of gravity will normally be located within a relatively small range in the fore and aft direction, no matter what the density and quantity of the load are.

Attached to the underside of the frame is a pair of pedestals 18 and 20. The pedestals are identical, and, as shown in FIG. 1, pedestal 18 comprises a vertical member 22 and an oblique reinforcing member 24. The vertical member engages the ground at a location forward of the point directly underneath the location of the center of gravity. the pedestals are connected by a transverse reinforcing member 25. An elongated handle 26 extends upward and to the rear from the rear of the frame, and the receptacle is attached to the handle by a suitable fastener, such as the fastener shown, which comprises a U-bolt 28 spanned by a metal plate 30. The handle is preferably a telescoping handle comprising an upper part 32 having a T-shaped grip 34 at its upper end, and a lower part 36 receiving part 32. Parts 32 and 36 are secured together by a removable pin 38. If plural holes are provided in one of members 32 and 36, the pin allows the overall length of the handle to be adjusted by connecting the two parts together a desired one of two or more possible relationships. The receptacle has a lip 40, and a notch 42 (FIGS. 2 and 3) is preferably provide in the lip to receive part 36 of the handle so that the rear wall 44 of the receptacle can rest against part 36.

Figure 3:
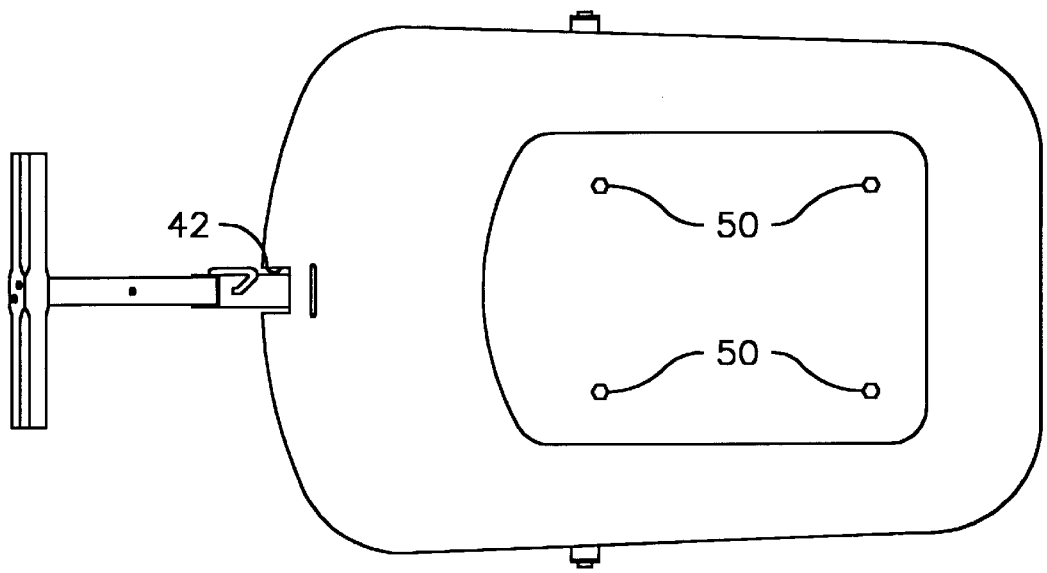
FIG. 3 is a top plan view thereof.
Figure 4:
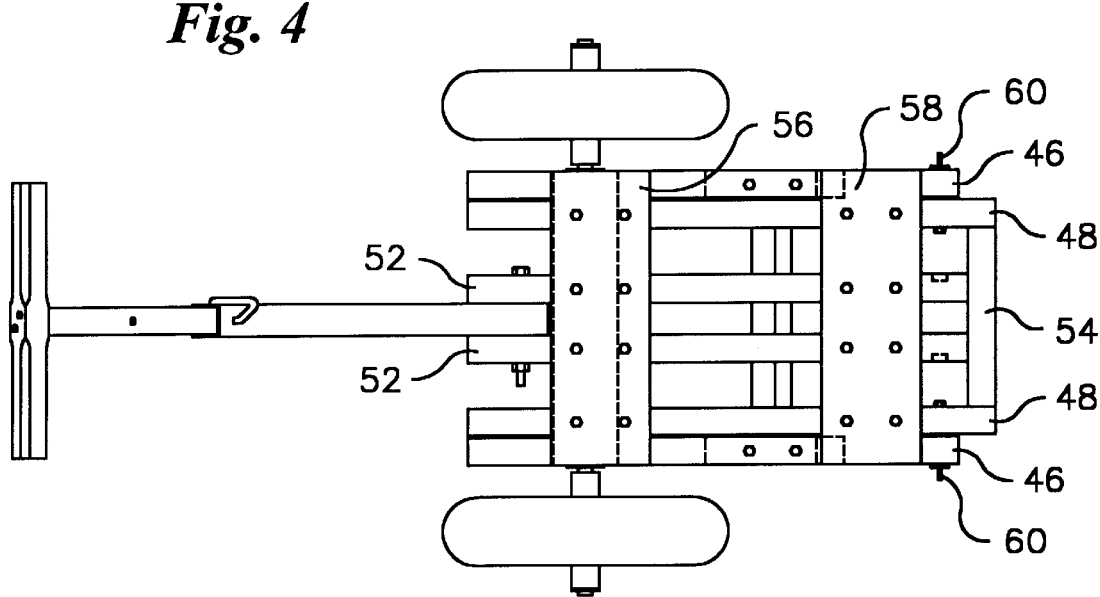
FIG. 4 is a top plan view of the vehicle with the load-receiving receptacle removed to reveal the frame structure.

For lightness in weight, the frame 10 is preferably formed from bars of glass fiber-reinforced polyester resin or a similar high-strength, light weight material. As shown in FIG. 4, the frame 10 comprises two outer members 46, to which the axle of the wheels and the pedestals are connected, and an inner frame structure, to which the receptacle is secured by bolts 50 (FIG. 3). The inner frame structure comprises four longitudinal members, including two outer longitudinal members 48, and two inner longitudinal members 52, the handle being bolted to the inner longitudinal members. The inner frame structure also includes a front cross-member 54, and intermediate cross-members 56 and 58, which are bolted to members 48 and 52, and to which the bolts 50 (FIG. 3) are secured. Cross members 56 and 58 overlap, and normally rest upon, the outer frame members 46. The inner frame structure is pivoted to the outer frame members 46 by bolts 60 near the front of the load carrier.

To move the load carrier, assuming that the receptacle 12 is already filled with a granular material, the operator exerts a downward force on grip 34, causing the carrier to pivot rearwardly about the axle so that the pedestals are lifted off the ground. Because the axle is just a short distance to the rear of a point directly underneath the center of gravity of the load carrier and its load, the downward force required to lift the pedestals off the ground is small, typically not more than about twenty pounds. While holding the pedestals off the ground, the operator can propel the load carrier in any desired direction by exerting a horizontal pushing or pulling force on the grip.

Figure 5:
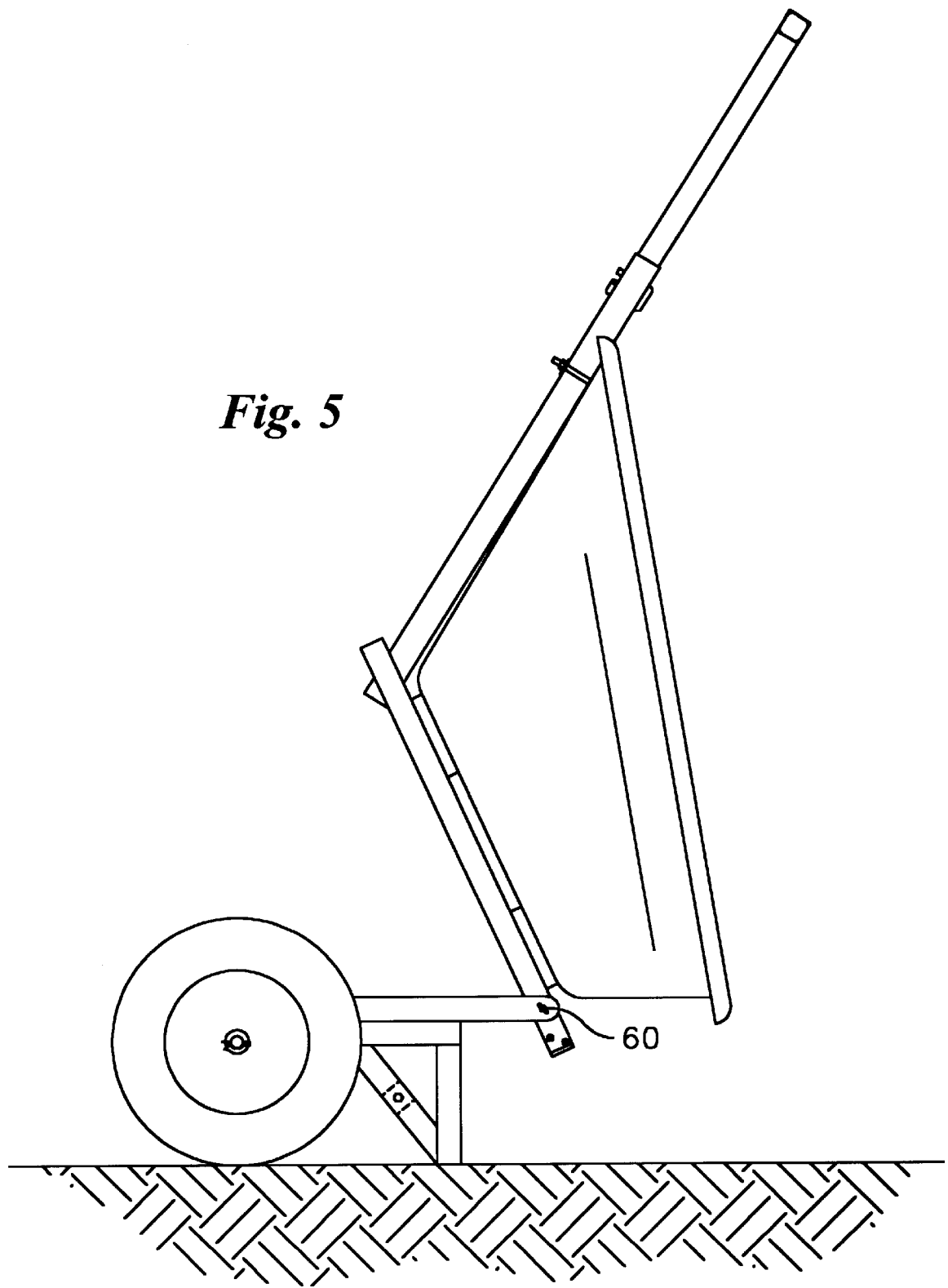
FIG. 5 is a side elevation illustrating the dumping operation.

To discharge the granular load, the operator simply releases the downward force on the grip, allowing the pedestals to engage the ground, and then pushes forward on the grip to cause the inner frame to pivot forward on pins 60, as illustrated in FIG. 5. The pedestals allow the receptacle to be tilted sufficiently to discharge a granular load while the front edge of the receptacle is off the ground, and thereby facilitate complete discharge of the load. The engagement of the pedestals with the ground provides sufficient friction to resist forward rolling of the load carrier during dumping.

The force required to tip the receptacle forward is somewhat larger than the force required to raise the pedestals off the ground. However, for most loads, the required force is easily exerted by the average operator. For exceptionally heavy loads, the length of the handle can be readily adjusted to increase the moment. Because the receptacle and the inner frame pivot forward on the outer frame, the wheels normally remain in contact with the ground, and the operator need not exert an additional force to lift the wheels.

Figure 6:
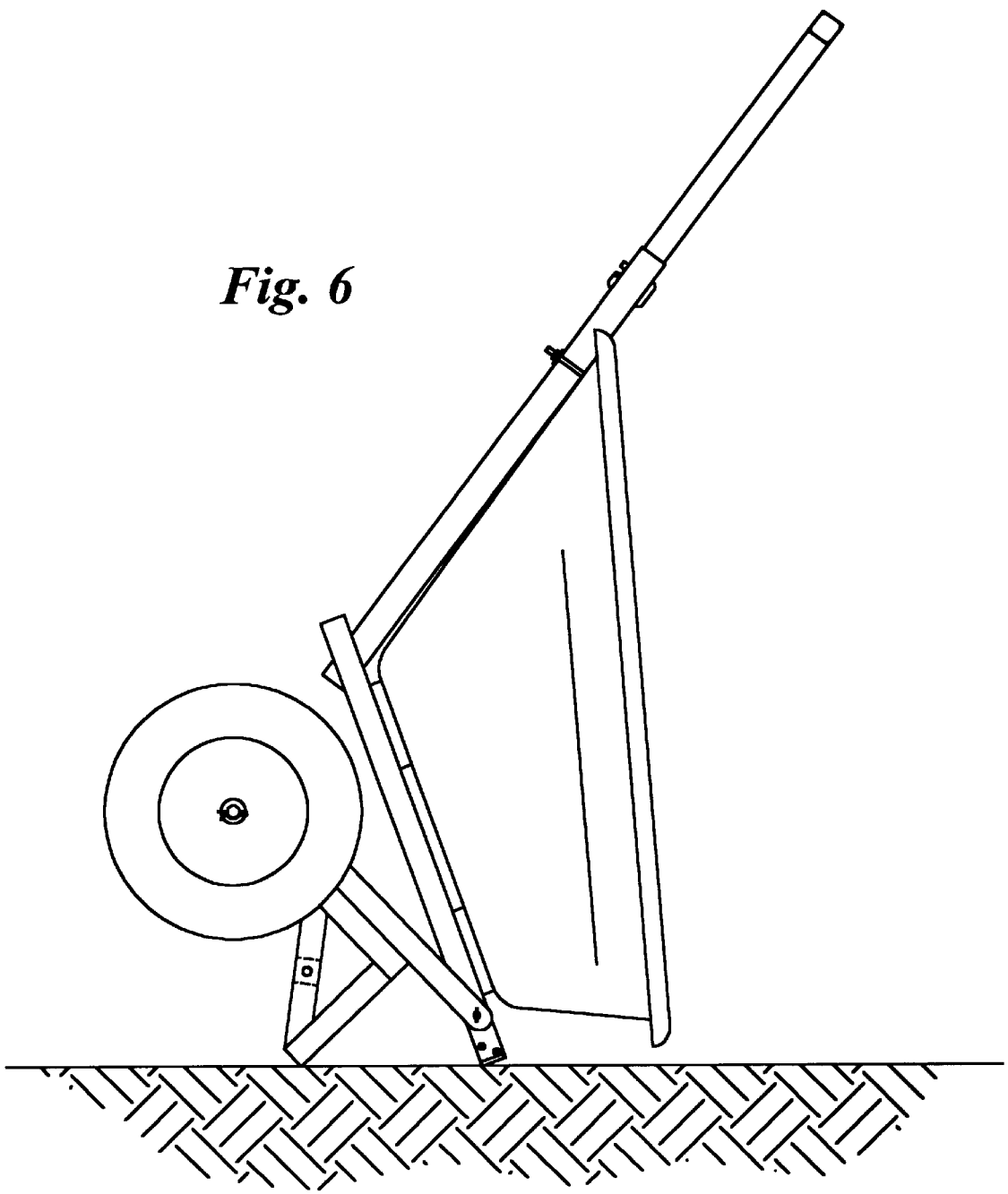
FIG. 6 is a side elevation illustrating an other aspect of the dumping operation.

The pivot bolts 60 are located forward of the pedestals, and, when the receptacle is tilted forward, the center of gravity of the combined receptacle and its load may move forward of the pedestals. Therefore, while dumping a particularly heavy load, the load carrier may initially pivot forward on the contact points between the pedestals and the ground, causing the wheels to rise off the ground as illustrated in FIG. 6. However, when the load is partially discharged, the weight of the load exerted forward of the pedestals decreases, and the wheels return to the ground, raising the top edge of the front wall of the receptacle off the ground and thereby allowing the load to be discharged completely. In any case, upon completion of discharge of a granular load, the upper edge of the front wall of the receptacle is positioned in relation to the pivot axis established by bolts 60 so that, with the wheels in contact with the ground, the front wall of the receptacle can assume a forward and downward slope sufficient to discharge the load, while the upper edge of the receptacle is spaced from the ground.

Although the pedestals keep the front edge of the receptacle off the ground, at least after the load is partially discharged, it is possible to bring the front edge of the receptacle into contact with, or into close proximity with, the ground by intentionally tilting the outer frame structure forward as shown in FIG. 6. With the receptacle in this position, large rocks, root balls of bushes or small trees, and other non-granular loads can easily be loaded onto the load carrier.

Figure 7:
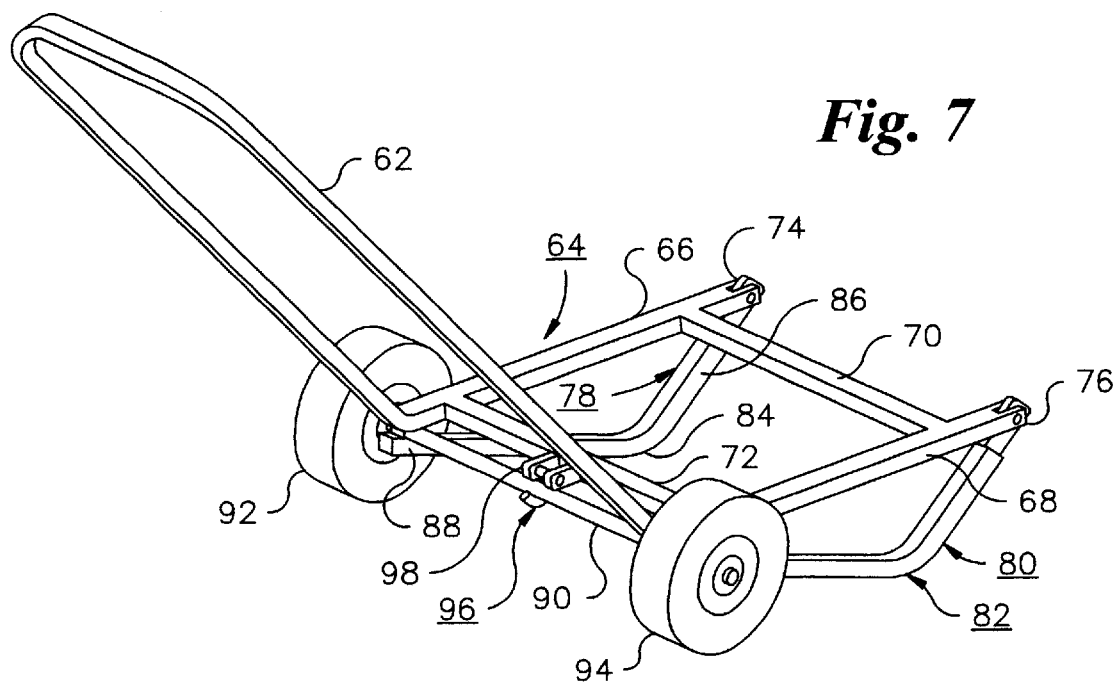
FIG. 7 is a perspective view showing the frame of an alternative embodiment of the load-carrying vehicle in its load carrying position.

In the alternative embodiment shown in FIG. 7, the handle 62 is preferably in the form of an inverted U. The handle is fixed to a second frame 64, which comprises two longitudinal side members 66 and 68, a front cross member 70, and a rear cross member 72. The longitudinal members 66 and 68 extend forward of the front cross member 70, and are hinged respectively, by hinges 74 and 76, to front ends of longitudinal members 78 and 80 of a first frame 82.

Each of the longitudinal members 78 and 80 is generally V-shaped. Member 78, for example, is composed of a centrally located, ground-engaging part 84, from which a front part 86 extends upward and forward to hinge 74, and from which a rear part 88 extends upward and rearward. Longitudinal member 80 is similar to member 78. Both longitudinal members are fixed near their rear ends to an axle 90, which extends between outboard wheels 92 and 94. The axle 90 can be in the form of a tube through which a rotating axle rod extends. The first frame 82 includes the axle 90, together with longitudinal members 78 and 80.

As seen in FIG. 7, when the second frame is in its hauling position, the axle 90 of the first frame is located slightly below and to the rear of the rear cross member 72 of the second frame. The central part of the axle serves as a retainer for a latching hook 96, which depends from a bracket 98 projecting rearward from the second frame rear cross member 72. Referring to FIG. 9, bracket 98 rests on axle 90 when the second frame is in the hauling position. The hook is pivoted on bracket 98 for free movement in the forward and rearward directions. The position of the hook relative to bracket 98 is determined by gravity and is therefor dependent on the attitude of the second frame. The hook comprises a generally vertical leg 100 and a part 102 extending forward from the lower part of leg 100. The hook can, of course, take a variety of shapes. Its leg 100 is located just forward of axle 90 and can be in contact with the axle. Its part 102 is located just below axle 90, with a small clearance between the axle and part 102 when the second frame member is in the hauling position. The clearance is such that the hook can pivot forward automatically by gravity to clear axle 90 when the second frame member is tilted forward on hinges 74 and 76, as illustrated in FIGS. 8 and 10.

Figure 8:
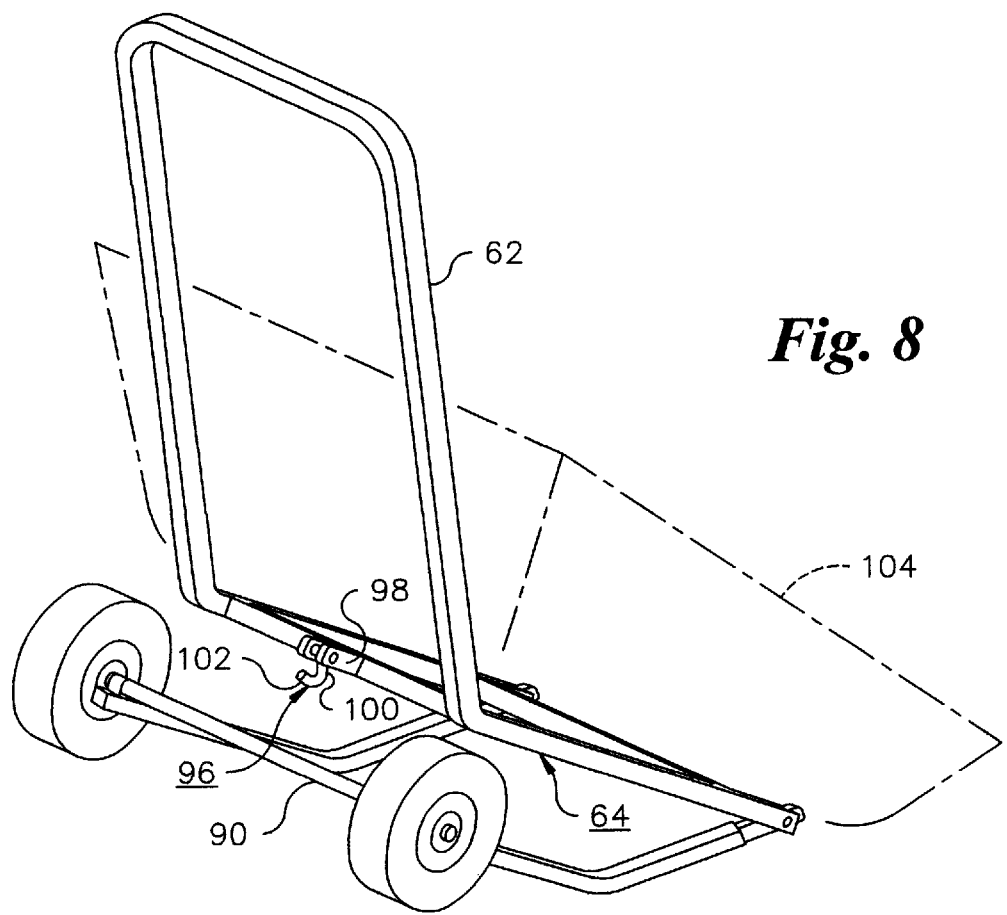
FIG. 8 is a perspective view showing the load-carrying vehicle of FIG. 7 in its dumping position.
Figure 9:
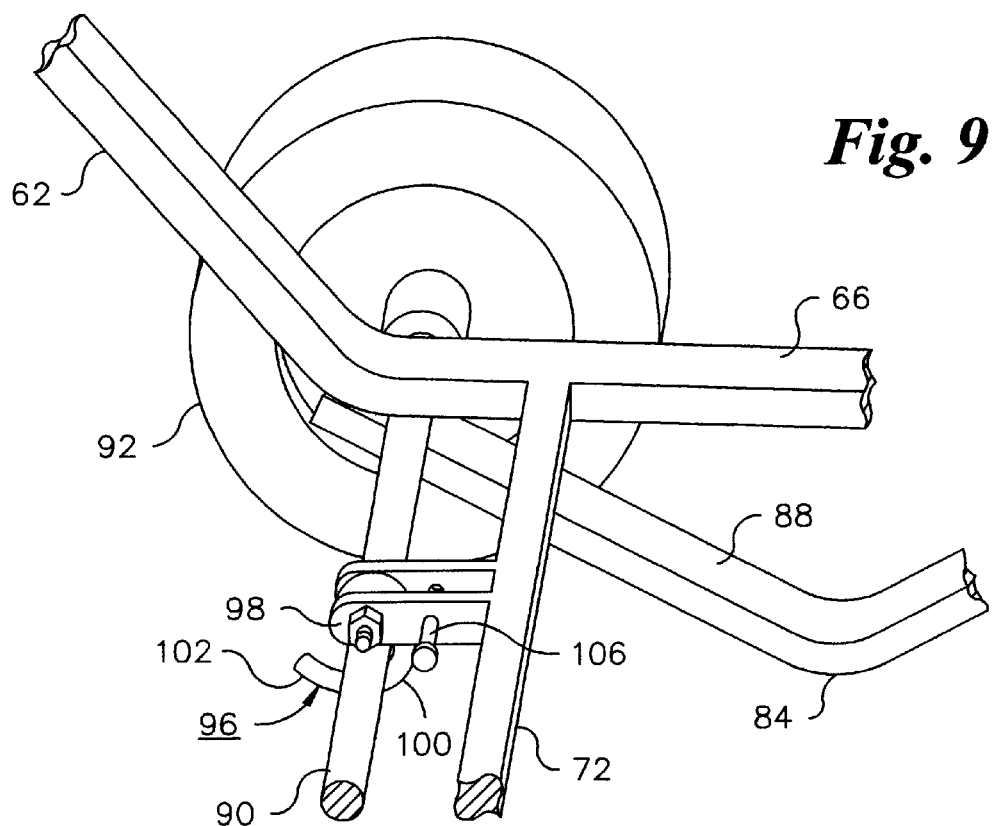
FIG. 9 is a fragmentary perspective view showing the latching device for holding the pivoting frames together.
Figure 10:
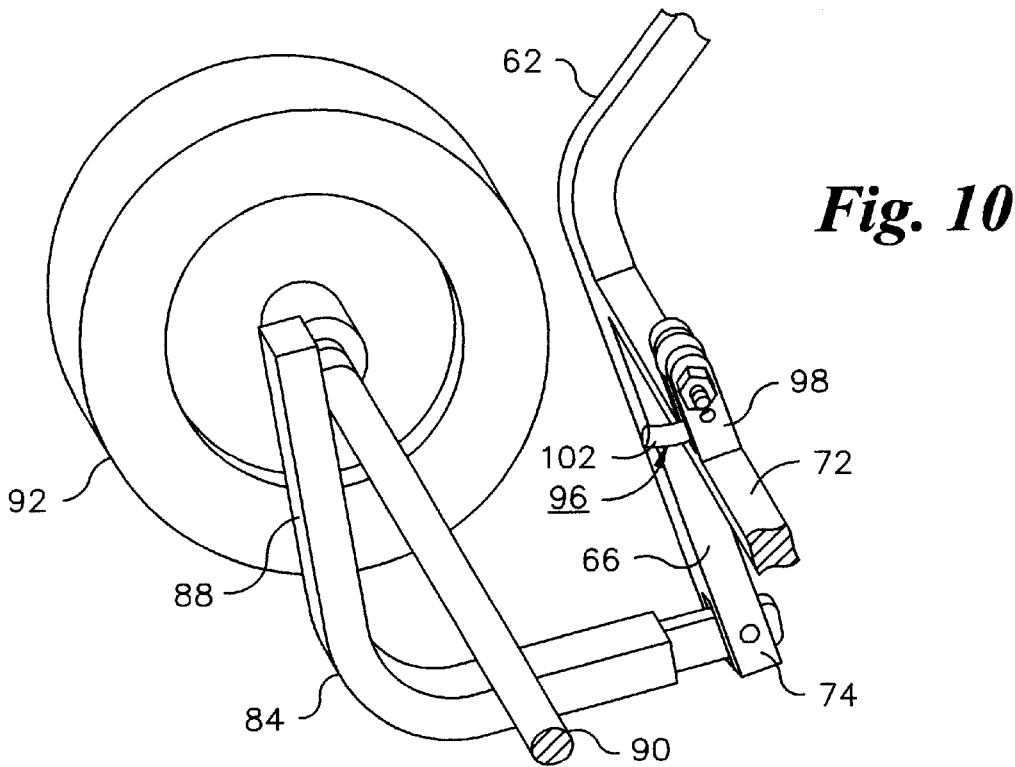
FIG. 10 is a fragmentary perspective view showing the latching device in its released condition.

As shown in FIGS. 8 and 10, the second frame 64 is being tilted forward to dump the contents (not shown) of a receptacle 104 which is attached to the second frame. As the second frame is tilted forward, the weight of the load can cause the first frame to tilt forward so that the front parts of the longitudinal elements 78 and 80 of the first frame lie on the ground, while the wheels are lifted away from the ground. This enables the upper edge of the front part of the receptacle to be brought into close proximity to the ground, as in FIG. 6.

The automatic latch keeps the frames from pivoting relative to each other, and thereby keeps the wheels in the proper relationship to the receptacle to permit the user to haul a heavy load up a slope, up steps, or over a curb, by pulling backward and upward on the handle. It also allows the user to dump the load simply by pushing forward on the handle. In some instances the user may desire to disable the automatic latch. This can be accomplished by inserting a pin 106 through a hole in bracket 98 so that the pin is located just in front of the leg 100 of the hook, preventing the hook from pivoting forward and disengaging the axle 90.

The load carrier can be modified in various ways. The receptacle 12 can be readily replaced by any of a variety of containers, buckets or platforms, and the wheels and pedestals can be readily replaced with larger or smaller wheels and pedestals to suit a particular application. Although fiberglass-reinforced polyester is a preferred material for the frame because of its light weight and high strength, other materials, such as steel, aluminum, and wood, can be used instead. In the alternative embodiment illustrated in FIGS. 7–10, the gravity-operated latch can take various forms. For example, hooks of various shapes can be used, the hook retaining surface can be a surface of the first frame separate from the axle, and multiple hooks can be provided if desired. It is also possible to provide a manually operated latch instead of a gravity-operated latch. For example, the latch can take the form of a clevis, with a pin which is manually inserted to lock the frame members in fixed relationship to each other.

Still other modifications may be made to the apparatus and method described above without departing from the scope of the invention as defined in the following claims.

What is claimed is:

1. A handle-propelled, load-carrying land vehicle comprising:

a first frame having a front, a rear and left and right sides;

an axle connected to the first frame adjacent the rear thereof and extending laterally therefrom;

wheels on the axle, the wheels being rotatable and positioned laterally outboard of the first frame;

a ground-engaging pedestal connected to the first frame and extending downward therefrom at a location forward of said axle;

a second frame pivotally connected to the first frame by a hinge having a hinge axis, substantially parallel to, and forward of, said axle, the second frame being pivotable forwardly and rearwardly about said hinge axis from a hauling position, in which it extends rearward from the hinge axis toward the axle, to a dumping position in which it extends upward from the first frame;

a stop on the first frame, engageable with the second frame, for limiting rearward pivoting movement of the second frame;

a handle rigidly connected to the second frame and extending upwardly and rearwardly therefrom, the handle being movable downwardly to rotate both frames about the axle so that the ground-engaging pedestal is lifted away from the ground and the frames can be moved on the wheels by manual operation of the handle, and also being movable upwardly to pivot the second frame forwardly about the hinge axis;

a load-receiving receptacle secured to the second frame and tiltable forwardly with the second frame when the second frame is pivoted forwardly about said hinge axis.

2. A handle-propelled, load-carrying land vehicle according to claim 1, in which the hinge axis is located adjacent the front of the first frame.

3. A handle-propelled, load-carrying land vehicle according to claim 1, in which the load-receiving receptacle has a bottom, and front, rear and side walls.

4. A handle-propelled, load-carrying land vehicle according to claim 3, in which the front wall of the load-receiving receptacle has an upper edge positioned in relation to the hinge axis so that, with the wheels in contact with the ground, the front wall of the receptacle can assume a forward and downward slope sufficient to discharge a granular load, while said upper edge is spaced from the ground.

5. A handle-propelled, load-carrying land vehicle according to claim 3, in which the front wall of the receptacle has a top edge, and in which the pedestal is positioned so that it engages the ground at a contact location forward of the axle but rearward of the hinge axis, whereby the first frame can be tilted forward on the pedestal about the contact location to bring the top edge of the front wall of the receptacle into close proximity to the ground.

6. A handle-propelled, load-carrying land vehicle according to claim 1, having a releasable latch connecting the first and second frames to hold the second frame substantially in said hauling position when said handle is pulled upward in a direction to lift the wheels off the ground.

7. A handle-propelled, load-carrying land vehicle according to claim 1, having means for holding the second frame substantially in said hauling position when said handle is pulled upward in a direction to lift the wheels off the ground, and for automatically releasing the second frame for pivoting to said dumping position when the handle is pushed forward while the wheels are on the ground.

8. A handle-propelled, load-carrying land vehicle according to claim 7 including selectably engageable locking means for preventing automatic release of the second frame.

9. A handle-propelled, load-carrying land vehicle according to claim 1, having a hook pivotally suspended from the second frame, and a hook-retaining surface on the first frame, the hook comprising a leg extending downward from the second frame and a retaining surface-engaging element projecting rearwardly from the leg and located so that it is below and spaced from the hook-retaining surface when the second frame is in its hauling position and no upward pulling force is exerted on the handle, the spacing being sufficiently small that the retaining surface-engaging element engages the hook-retaining surface to hold the second frame substantially in said hauling position when said handle is pulled upward in a direction to lift the wheels off the ground, but allowing the hook to clear the hook-retaining surface automatically when the handle is pushed forward while the wheels are on the ground.

10. A handle-propelled, load-carrying land vehicle according to claim 9 including a lock selectably positionable forward of the leg of the hook and engageable thereby, for limiting forward movement of the hook and thereby maintaining the retaining surface-engaging element of the hook in a position to engage the retaining surface to prevent automatic release of the second frame.

* * * * *